(12) United States Patent
Takemura

(10) Patent No.: US 9,368,059 B2
(45) Date of Patent: Jun. 14, 2016

(54) SEMICONDUCTOR DEVICE AND DRIVING METHOD THEREOF

(71) Applicant: Semiconductor Energy Laboratory Co. Ltd., Atsugi-shi, Kanagawa-ken (JP)

(72) Inventor: Yasuhiko Takemura, Isehara (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 151 days.

(21) Appl. No.: 14/188,029

(22) Filed: Feb. 24, 2014

(65) Prior Publication Data

US 2014/0247254 A1 Sep. 4, 2014

(30) Foreign Application Priority Data

Mar. 1, 2013 (JP) ................... 2013-040649

(51) Int. Cl.
*G09G 3/32* (2006.01)
*G06F 3/041* (2006.01)
*G06F 3/042* (2006.01)

(52) U.S. Cl.
CPC ............ *G09G 3/32* (2013.01); *G06F 3/0412* (2013.01)

(58) Field of Classification Search
CPC ........ G06F 3/0412; G06F 3/0416; G09G 3/32
USPC ........................................................ 345/204
See application file for complete search history.

(56) References Cited

U.S. PATENT DOCUMENTS

| | | | | |
|---|---|---|---|---|
| 4,345,248 A * | 8/1982 | Togashi | ............... | G02F 1/13338 345/206 |
| 7,023,503 B2 * | 4/2006 | den Boer | .......... | H01L 27/14609 250/208.1 |
| 7,180,092 B2 * | 2/2007 | Yamazaki | ........... | G02F 1/13318 257/59 |
| 7,663,607 B2 | 2/2010 | Hotelling et al. | | |
| 8,125,463 B2 | 2/2012 | Hotelling et al. | | |
| 8,416,209 B2 | 4/2013 | Hotelling et al. | | |
| 8,605,051 B2 | 12/2013 | Hotelling et al. | | |
| 2007/0195020 A1 * | 8/2007 | Nathan | ................ | G09G 3/3233 345/76 |
| 2009/0066670 A1 | 3/2009 | Hotelling et al. | | |
| 2009/0096757 A1 | 4/2009 | Hotelling et al. | | |
| 2011/0215323 A1 | 9/2011 | Kurokawa et al. | | |
| 2012/0061556 A1 * | 3/2012 | Chan | ........................ | G09G 3/20 250/214 R |
| 2013/0084665 A1 * | 4/2013 | Yamazaki | ............. | G06F 3/0412 438/34 |
| 2013/0299888 A1 | 11/2013 | Kurokawa et al. | | |

FOREIGN PATENT DOCUMENTS

| | | | |
|---|---|---|---|
| CA | 2576811 A1 | * | 5/2007 |
| JP | 05-249498 A | | 9/1993 |
| JP | 2011-081825 A | | 4/2011 |
| JP | 2011-211699 A | | 10/2011 |
| JP | 2012-043460 A | | 3/2012 |

* cited by examiner

*Primary Examiner* — Julie Anne Watko
(74) *Attorney, Agent, or Firm* — Robinson Intellectual Property Law Office; Eric J. Robinson

(57) ABSTRACT

A semiconductor device having a novel data input and output panel with high definition is provided. A method for driving the semiconductor device having the novel data input and output panel with high definition is provided. The data input and output panel includes, over a substrate, proximity sensors, signal lines electrically connected to the proximity sensors, and pixels electrically connected to the signal lines. The signal lines can supply image signals to the pixels, can supply control signals to the proximity sensors, and can be supplied with sensing signals from the proximity sensors.

13 Claims, 11 Drawing Sheets

SEMICONDUCTOR DEVICE AND DRIVING METHOD THEREOF

BACKGROUND OF THE INVENTION

1. Field of the Invention

The present invention relates to an object, a method, or a manufacturing method. In addition, the present invention relates to a process, a machine, manufacture, or a composition of matter. In particular, the present invention relates to, for example, a semiconductor device, a display device, a light-emitting device, a power storage device, a driving method thereof, or a manufacturing method thereof. Specifically, the present invention relates to, for example, a data input and output panel and a method for driving the data input and output panel.

2. Description of the Related Art

A CMOS image sensor in which a plurality of imaging elements are arranged in matrix is known.

In addition, an invention having a structure in which transistors whose channel formation regions are formed using an oxide semiconductor are used as a charge accumulation control transistor and a reset transistor is known. The invention enables a distortion free image to be taken using the following driving method: after the reset operation of a signal charge accumulation portion is performed in each of imaging elements arranged in matrix, the accumulation operation of charge is performed by a photodiode in each of imaging elements, and a signal is read from a pixel in each row.

REFERENCE

Patent Document

[Patent Document 1] Japanese Published Patent Application No. 2011-211699

SUMMARY OF THE INVENTION

In the case where a portable information terminal is used in a user's hand, the hand cannot be freely moved. For this reason, a keyboard, which requires both hands to be used, a mouse, and the like are not suitable for units for inputting data in a portable information terminal held by a hand. A unit is desired which allows efficient input of data to a portable information terminal held by a hand even with the use of a finger or the like which cannot be freely moved.

In a touch panel, for example, an input unit is integrated into a display portion; thus, data visually output on the display portion can be selected using a finger or the like and input data can be displayed in a region which is pointed out with a finger. Owing to this, an electronic device including a touch panel allows a user to input and output data very intuitively, and as a result, the operational performance of the electronic device can be improved.

Further, since a portable information terminal is operated in user's hand, in many cases, the distance between a display portion and user's eyes is short as compared with the cases of a computer, a television set, and the like. For this reason, a display portion with pixels which are so minute that a user cannot recognize the pixels is desired.

To meet those demands, it is necessary to very densely arrange proximity sensors which sense a finger and the like, pixels, a wiring capable of supplying signals to the pixels, and the like in a display portion with high density.

One embodiment of the present invention is made in view of the foregoing technical background. Thus, one object is to provide a semiconductor device having a novel data input and output panel with high definition. Another object is to provide a method for driving a semiconductor device having a novel data input and output panel with high definition.

Note that the descriptions of these objects do not disturb the existence of other objects. In one embodiment of the present invention, there is no need to achieve all the objects. Other objects are apparent from and can be derived from the description of the specification, the drawings, the claims, and the like.

One embodiment of the present invention is a semiconductor device having a data input and output panel including proximity sensors, signal lines electrically connected to the proximity sensors, pixels electrically connected to the signal lines, and a substrate having an insulating surface over which the proximity sensors, the signal lines, and the pixels are provided. The signal lines are configured to supply image signals to the pixels and to be supplied with sensing signals from the proximity sensors.

Another embodiment of the present invention is a semiconductor device having a data input and output panel including proximity sensors, signal lines electrically connected to the proximity sensors, pixels electrically connected to the signal lines, and a substrate having an insulating surface over which the proximity sensors, the signal lines, and the pixels are provided. The signal lines are configured to supply image signals to the pixels and to supply control signals to the proximity sensors.

In the data input and output panel of one embodiment of the present invention, an electrical connection is made so that one signal line from which an image signal is transferred to pixels can be supplied with a sensing signal from a proximity sensor or can supply a control signal to the proximity sensor. In such a manner, the number of signal lines can be reduced and as a result, a novel data input and output panel in which an area occupied by signal lines is reduced without increasing electric resistance of the signal lines can be provided. Alternatively, in such a manner, an extra signal line is unnecessary and as a result, a novel data input and output panel in which electric resistance of signal lines is reduced without increasing an area occupied by the signal lines can be provided.

Another embodiment of the present invention is a semiconductor device having a data input and output panel including a first proximity sensor, a second proximity sensor, a signal line electrically connected to the first proximity sensor and the second proximity sensor, pixels electrically connected to the signal line, and a substrate having an insulating surface over which the first proximity sensor, the second proximity sensor, the signal line, and the pixels are provided. The signal line is configured to supply an image signal to the pixels and to supply a control signal to the first proximity sensor and the second proximity sensor.

Another embodiment of the present invention is a semiconductor device having a data input and output panel including a first proximity sensor, a second proximity sensor, a third proximity sensor, a first signal line electrically connected to the first proximity sensor, a second signal line electrically connected to the first proximity sensor and the second proximity sensor, a third signal line electrically connected to the first proximity sensor and the third proximity sensor, first pixels electrically connected to the first signal line, second pixels electrically connected to the second signal line, third pixels electrically connected to the third signal line, and a substrate having an insulating surface over which the first proximity sensor, the second proximity sensor, the third proximity sensor, the first signal line, the second signal line, the third signal line, the first pixels, the second pixels, and the third pixels are provided. The first signal line is configured to supply a first image signal to the first pixels and to be supplied with a sensing signal from the first proximity sensor. The second signal line is configured to supply a second image signal to the second pixels and to supply a first control signal to the first proximity sensor and the second proximity sensor. The third signal line is configured to supply a third image signal to the third pixels and to supply a second control signal to the first proximity sensor and the third proximity sensor.

In the data input and output panel of one embodiment of the present invention, an electrical connection is made so that one signal line from which an image signal is transferred to pixels can be supplied with a sensing signal from a proximity sensor. In addition, the proximity sensor is supplied with a control signal from the signal line. In such a manner, the number of signal lines can be reduced and as a result, a novel data input and output panel in which an area occupied by signal lines is reduced without increasing electric resistance of the signal lines can be provided. Alternatively, in such a manner, an extra signal line is unnecessary and as a result, a novel data input and output panel in which electric resistance of signal lines is reduced without increasing an area occupied by the signal lines can be provided.

Another embodiment of the present invention is the above data input and output panel in which the proximity sensors are arranged scatteringly or discretely in a display portion where the pixels are arranged in matrix.

In the above data input and output panel of one embodiment of the present invention, the proximity sensors are arranged scatteringly or discretely at predetermined positions in the display portion where the pixels are arranged in matrix. Further, electrical connections are made so that the signal lines from which image signals are transferred to the pixels can be supplied with sensing signals from the proximity sensors. Accordingly, data can be displayed on the display portion and in addition, a signal specifying the coordinates in the display portion can be input. As a result, it is possible to provide a novel data input and output panel to which data associated with displayed data can be input.

Another embodiment of the present invention is the above data input and output panel further including, over the substrate over which the proximity sensors, the signal lines, and the pixels are provided, a selection circuit for choosing whether to supply image signals or control signals to the signal lines or to be supplied with sensing signals from the signal lines, a proximity sensor driver circuit electrically connected to the signal lines, and a pixel driver circuit electrically connected to the signal lines.

The above data input and output panel of one embodiment of the present invention includes, over one substrate, the proximity sensors, the pixels, and the signal lines which can transfer image signals to the pixels and to which sensing signals can be supplied from the proximity sensors. Further, the proximity sensor driver circuit for driving the proximity sensors and the pixel driver circuit are provided over the same substrate. With such a structure, the proximity sensor driver circuit and/or the pixel driver circuit can be formed using the same process as the pixel. Accordingly, a novel data input and output panel that requires a reduced number of manufacturing steps can be provided.

Another embodiment of the present invention is a semiconductor device having a data input and output panel including a proximity sensor, a first signal line electrically connected to the proximity sensor, a second signal line electrically connected to the proximity sensor, a first pixel column electrically connected to the first signal line, a second pixel column electrically connected to the second signal line, a wiring capable of supplying a common potential, and a substrate having an insulating surface over which the proximity sensor the first signal line, the second signal line, the first pixel column, the second pixel column, and the wiring are provided. The first signal line is configured to supply an image signal to first pixel column and to be supplied with a sensing signal from the proximity sensor. The second signal line is configured to supply an image signal to the second pixel column and to supply a control signal (e.g., a reset signal) to the proximity sensor. Further, the proximity sensor includes a first transistor, a second transistor, and a photoelectric conversion element. A gate and a first electrode of the first transistor are electrically connected to the second signal line and the wiring capable of supplying the common potential, respectively. A gate, a first electrode, and a second electrode of the second transistor are electrically connected to a second electrode of the first transistor, the wiring capable of supplying the common potential, and the first signal line, respectively. A first electrode and a second electrode of the photoelectric conversion element are electrically connected to the wiring capable of supplying the common potential and the second electrode of the first transistor, respectively.

Another embodiment of the present invention is a semiconductor device having a data input and output panel including a proximity sensor, a first signal line electrically connected to the proximity sensor, a second signal line electrically connected to the proximity sensor, a third signal line electrically connected to the proximity sensor, a first pixel column electrically connected to the first signal line, a second pixel column electrically connected to the second signal line, a third pixel column electrically connected to the third signal line, a wiring capable of supplying a common potential, and a substrate having an insulating surface over which the proximity sensor, the first signal line, the second signal line, the third signal line, the first pixel column, the second pixel column, the third pixel column, and the wiring are provided. The first signal line is configured to supply an image signal to the first pixel column and to be supplied with a sensing signal from the proximity sensor. The second signal line is configured to supply an image signal to the second pixel column and to supply a first control signal (e.g., a reset signal) to the proximity sensor. The third signal line is configured to supply an image signal to the third pixel column and to supply a second control signal (e.g., a trigger signal) to the proximity sensor. Further, the proximity sensor includes a first transistor, a second transistor, a third transistor, and a photoelectric conversion element. A gate and a first electrode of the first transistor are electrically connected to the second signal line and the wiring capable of supplying the common potential, respectively. A gate, a first electrode, and a second electrode of the second transistor are electrically connected to a second electrode of the first transistor, the wiring capable of supplying the common potential, and the first signal line, respectively. A gate and a first electrode of the third transistor are electrically connected to the third signal line and the second electrode of the first transistor, respectively. A first electrode and a second electrode of the photoelectric conversion element are electrically connected to the wiring capable of supplying the common potential and a second electrode of the third transistor, respectively.

The above data input and output panel of one embodiment of the present invention includes the pixels, the signal lines, and the proximity sensors each including the photoelectric conversion element. The signal lines can supply image signals to the pixels, can supply control signals to the proximity sensors, and can be supplied with sensing signals from the proximity sensors. In such a manner, the number of signal lines can be reduced and as a result, a novel data input and output panel in which an area occupied by signal lines is reduced without increasing electric resistance of the signal lines can be provided. Alternatively, in such a manner, an extra signal line is unnecessary and as a result, a novel data input and output panel in which electric resistance of signal lines is reduced without increasing an area occupied by the signal lines can be provided.

Another embodiment of the present invention is a method for driving the above data input and output panel including the steps of: supplying image signals to pixels electrically connected to the first signal line, the second signal line, and the third signal line; supplying the first control signal (e.g., a reset signal) to the proximity sensor; supplying the second control signal (e.g., a trigger signal) to the proximity sensor; and acquiring the sensing signal supplied from the proximity sensor.

In the above method for driving the data input and output panel of one embodiment of the present invention, after supply of one frame image signal from one signal line to the pixels in the display portion, a reset signal is supplied to the proximity sensor, a trigger signal is supplied to the proximity sensor, and a sensing signal is acquired from the proximity sensor. In this manner, data can be displayed on the display portion. Further, data can be input using a sensing signal acquired from the proximity sensor. Accordingly, a method for driving a semiconductor device having a novel data input and output panel with high definition display and high input resolution can be provided.

In this specification, one of a first electrode and a second electrode of a transistor refers to a source electrode and the other refers to a drain electrode.

One embodiment of the present invention can provide a semiconductor device having a novel data input and output panel with high definition. Another embodiment of the present invention can provide a method for driving a semiconductor device having a novel data input and output panel with high definition.

BRIEF DESCRIPTION OF THE DRAWINGS

FIGS. 3A, 3B1, 3B2, and 3C are block diagrams each illustrating a configuration of a data input and output panel of an embodiment.

DETAILED DESCRIPTION OF THE INVENTION

Figure 1A:
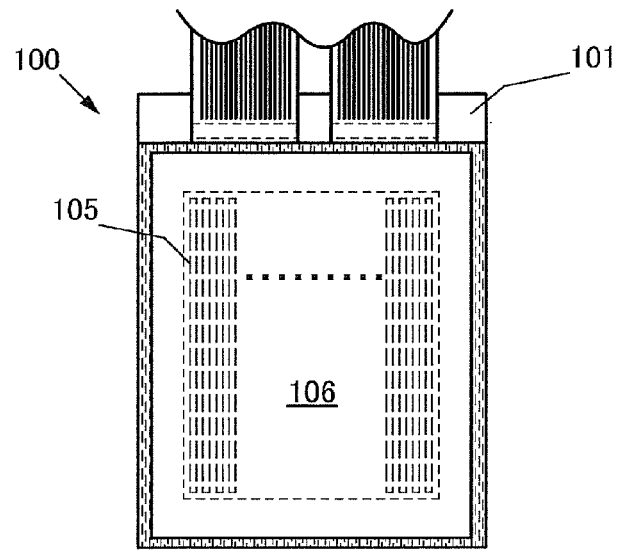
FIGS. 1A to 1C are block diagrams each illustrating a configuration of a data input and output panel of an embodiment.

To achieve the above objects, one embodiment of the present invention is made with a focus on a proximity sensor, a signal line, a pixel, and electrical connections thereof. This leads to a semiconductor device that can be used for a data input and output panel having a structure exemplified in this specification.

A data input and output panel of one embodiment of the present invention includes, over a substrate, proximity sensors, signal lines electrically connected to the proximity sensors, and pixels electrically connected to the signal lines. The signal lines can supply image signals to the pixels, can supply control signals to the proximity sensors, and can be supplied with sensing signals from the proximity sensors. In such a manner, the number of signal lines can be reduced and as a result, a novel data input and output panel in which an area occupied by signal lines is reduced without increasing electric resistance of the signal lines can be provided. Alternatively, in such a manner, an extra signal line is unnecessary and as a result, a novel data input and output panel in which electric resistance of signal lines is reduced without increasing an area occupied by the signal lines can be provided.

Embodiments will be described in detail with reference to drawings. Note that the present invention is not limited to the following description, and it will be easily understood by those skilled in the art that various changes and modifications can be made without departing from the spirit and scope of the present invention. Accordingly, the present invention should not be interpreted as being limited to the content of the embodiments below. In the structures of the invention to be described below, the same portions or portions having similar functions are denoted by the same reference numerals in different drawings, and explanation thereof will not be repeated.

Embodiment 1

In this embodiment, configurations of a data input and output panel of one embodiment of the present invention will be described with reference to FIGS. 1A to 1C and FIGS. 2A and 2B.

Figure 1B:
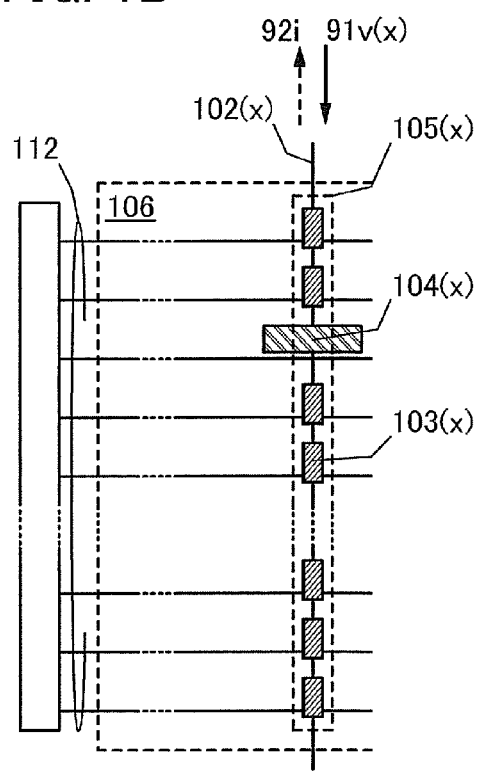
Figure 1C:
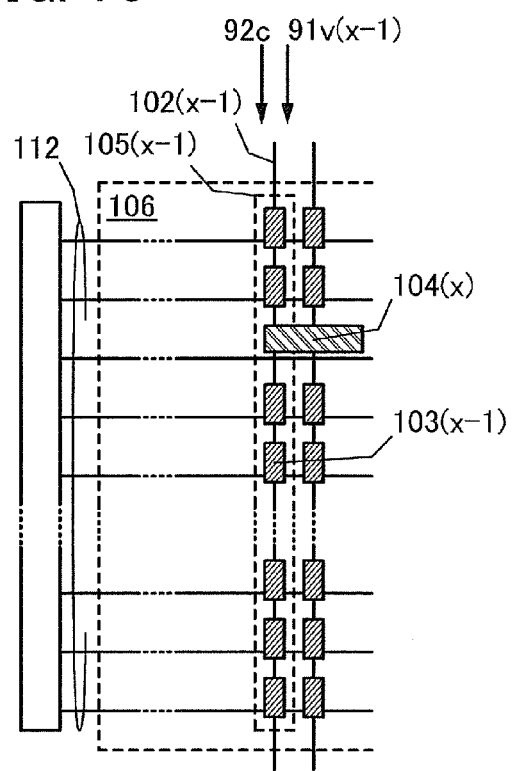

FIG. 1A is a top view of the data input and output panel of one embodiment of the present invention. FIGS. 1B and 1C are block diagrams each illustrating a configuration of a display portion in which a signal line, a pixel, and a proximity sensor are provided.

A data input and output panel 100 includes a substrate 101 having an insulating surface and a display portion 106. The display portion 106 includes a plurality of pixel columns 105 each of which has pixels connected to one signal line (see FIG. 1A). Note that one of the plurality of pixel columns 105 is referred to as a pixel column 105($x$), a pixel column 105($x$+1), or the like.

The data input and output panel of one embodiment of the present invention includes the pixel column 105($x$) (see FIG. 1B). The pixel column 105($x$) includes a proximity sensor 104($x$), a signal line 102($x$) electrically connected to the proximity sensor 104($x$), and a pixel 103($x$) electrically connected to the signal line 102($x$).

Note that the signal line 102(*x*) can supply an image signal 91*v*(*x*) to the pixel 103(*x*) and can be supplied with a sensing signal 92*i* from the proximity sensor 104(*x*).

Alternatively, the data input and output panel of one embodiment of the present invention includes a pixel column 105(*x*−1) (see FIG. 1C). The pixel column 105(*x*−1) includes a proximity sensor 104(*x*), a signal line 102(*x*−1) electrically connected to the proximity sensor 104(*x*), and a pixel 103(*x*−1) electrically connected to the signal line 102(*x*−1).

Note that the signal line 102(*x*−1) can supply an image signal 91*v*(*x*−1) to the pixel 103(*x*−1) and can supply a control signal 92*c* to the proximity sensor 104(*x*).

In the data input and output panel of one embodiment of the present invention, an electrical connection is made so that one signal line from which an image signal is transferred to the pixel can be supplied with a sensing signal from the proximity sensor. In such a manner, the number of signal lines can be reduced and as a result, a novel data input and output panel in which an area occupied by signal lines is reduced without increasing electric resistance of the signal lines can be provided. Alternatively, in such a manner, an extra signal line is unnecessary and as a result, a novel data input and output panel in which electric resistance of signal lines is reduced without increasing an area occupied by the signal lines can be provided. Note that in some cases, other effects or objects are achieved by the data input and output panel of one embodiment of the present invention.

Figure 2A:
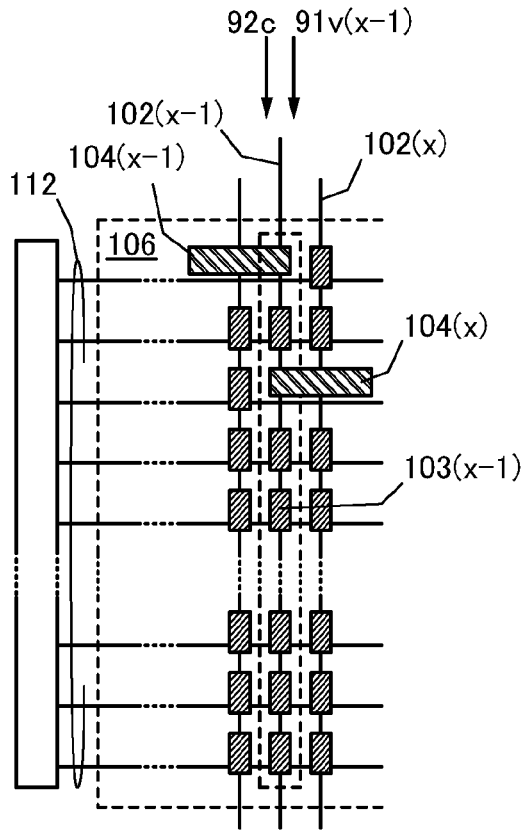
FIGS. 2A and 2B are block diagrams each illustrating a configuration of a data input and output panel of an embodiment.

A data input and output panel of another embodiment of the present invention includes a first proximity sensor 104(*x*), a second proximity sensor 104(*x*−1), a signal line 102(*x*−1) electrically connected to the first proximity sensor 104(*x*) and the second proximity sensor 104(*x*−1), and a pixel 103(*x*−1) electrically connected to the signal line 102(*x*−1) (see FIG. 2A).

Note that the signal line 102(*x*−1) can supply an image signal 91*v*(*x*−1) to the pixel 103(*x*−1) and can supply a control signal 92*c* (e.g., a reset signal) to the first proximity sensor 104(*x*) and the second proximity sensor 104(*x*−1).

Figure 2B:
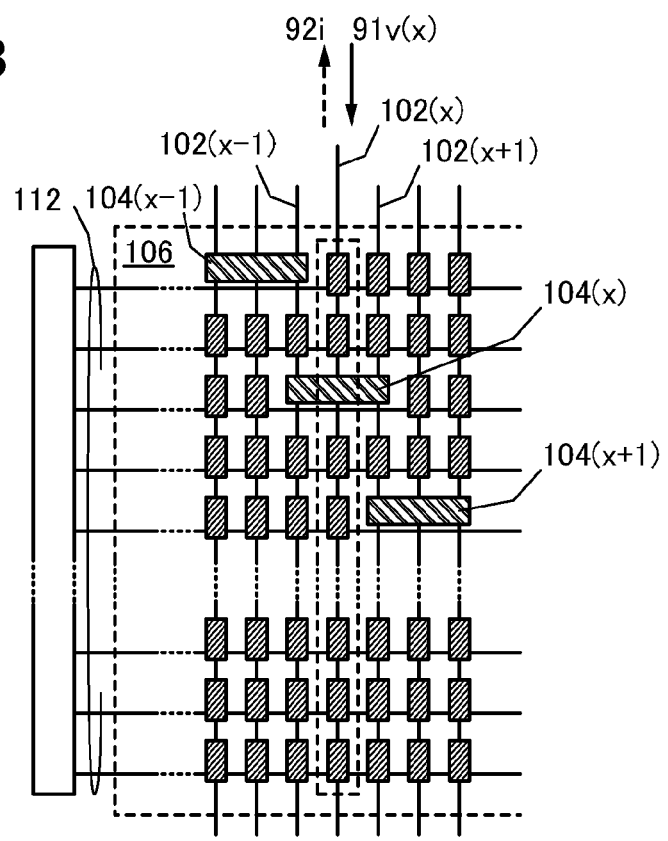

A data input and output panel of another embodiment of the present invention includes, over a substrate having an insulating surface, a first proximity sensor 104(*x*), a second proximity sensor 104(*x*−1), a third proximity sensor 104(*x*+1), a first signal line 102(*x*), a second signal line 102(*x*−1), and a third signal line 102(*x*+1) (see FIG. 2B).

The first signal line 102(*x*) is electrically connected to the first proximity sensor 104(*x*) and a plurality of pixels. Further, the first signal line 102(*x*) can supply an image signal 91*v*(*x*) to the pixels and can be supplied with a sensing signal 92*i* from the first proximity sensor 104(*x*).

The second signal line 102(*x*−1) is electrically connected to the first proximity sensor 104(*x*), the second proximity sensor 104(*x*−1), and a plurality of pixels. The second signal line 102(*x*−1) can supply an image signal to the pixels and can supply a first control signal (e.g., a reset signal) to the first proximity sensor 104(*x*) and the second proximity sensor 104(*x*−1).

The third signal line 102(*x*+1) is electrically connected to the first proximity sensor 104(*x*), the third proximity sensor 104(*x*+1), and a plurality of pixels. The third signal line 102(*x*+1) can supply an image signal to the pixels and can supply a second control signal (e.g., a trigger signal) to the first proximity sensor 104(*x*) and the third proximity sensor 104(*x*+1).

In the data input and output panel of one embodiment of the present invention, an electrical connection is made so that one signal line from which an image signal is transferred to the pixel can be supplied with a sensing signal from the proximity sensor. In such a manner, the number of signal lines can be reduced and as a result, a novel data input and output panel in which an area occupied by signal lines is reduced without increasing electric resistance of the signal lines can be provided. Alternatively, in such a manner, an extra signal line is unnecessary and as a result, a novel data input and output panel in which electric resistance of signal lines is reduced without increasing an area occupied by the signal lines can be provided. Note that in some cases, other effects or objects are achieved by the data input and output panel of one embodiment of the present invention.

Elements included in the data input and output panel of one embodiment of the present invention will be described below.

<<Substrate Having Insulating Surface>>

The substrate 101 has an insulating surface. The substrate 101 may be a conductive substrate, or a substrate having semiconductor characteristics on which an insulating film is stacked.

Note that the substrate 101 has heat resistance high enough to withstand the manufacturing process and are not particularly limited in thickness and size as long as they can be applied to a manufacturing apparatus. In addition, the substrate 101 may have a single-layer structure or a layered structure including two or more layers.

Examples of a material that can be used for the substrate 101 include glass, ceramics, a metal, an inorganic material, and a resin in a plate-like shape or a film-like shape, and a stack including some of these materials.

<<Proximity Sensor>>

The proximity sensor 104(*x*) has a function of sensing the proximity of a finger or the like. As the proximity sensor, a capacitive proximity sensor, an electromagnetic inductive proximity sensor, a photo-detection type proximity sensor, or the like can be used, for example.

A capacitive proximity sensor includes an electrode forming an electric field and operates using a phenomenon in which the capacitance of the electrode is changed by an object approaching a region where an electric field is formed. Such a sensor can sense the proximity of a fingertip, for example.

An electromagnetic inductive proximity sensor includes an oscillation circuit forming a magnetic field and operates using a phenomenon in which the circuit constant of the oscillation circuit is changed by current flowing in an object approaching a region where a magnetic field is formed. Such a sensor can sense the proximity of a stylus including a piece of metal or a coil, for example.

A photo-detection type proximity sensor includes a photo-electric conversion element for sensing brightness and operates with the strength of light blocked by, reflected by, or emitted from an object approaching a region where light can be sensed.

Note that a specific example of a photo-detection type proximity sensor will be described in detail in Embodiment 4.

<<Signal Line>>

The first signal line 102(*x*), the second signal line 102(*x*−1), the third signal line 102(*x*+1), and the like have conductivities and are formed over the insulating surface of the substrate 101. In the case where a circuit is formed over the insulating surface of the substrate 101, a wiring of the circuit can be formed using the same conductive film as the signal line.

For example, the first signal line 102(*x*) can supply an image signal to the pixels and can be supplied with a sensing signal from the first proximity sensor 104(*x*).

The second signal line 102(*x*−1) can supply an image signal to the pixels and can supply a first control signal (e.g., a reset signal) to the first proximity sensor 104(*x*) and the second proximity sensor 104(*x*−1).

The third signal line 102(x+1) can supply an image signal to the pixels and can supply a second control signal (e.g., a trigger signal) to the first proximity sensor 104(x) and the third proximity sensor 104(x+1).

Note that a specific example of a configuration in which a pixel and a photo-detection type proximity sensor are connected by a wiring will be described in detail in Embodiment 4.

<<Pixel>>

Image signal are supplied to the pixel 103(x−1), the pixel 103(x), and the like and as a result, an image is displayed. Each of the pixels includes a display element and a pixel circuit for driving the display element.

As the display element, any of a variety of display elements, such as an electro-optic element, a light-emitting element, and electronic ink, can be used.

Examples of an electro-optic element include a liquid crystal element and a display element including an optical interference element or a shutter controlled by micro electro mechanical systems (MEMS).

As the light-emitting element, an electroluminescent element or an LED can be used, for example.

Further, a circuit which is suitable for driving the display element used is selected as the pixel circuit.

This embodiment can be combined with any of the other embodiments in this specification as appropriate.

Embodiment 2

In this embodiment, arrangements of proximity sensors included in a data input and output panel of one embodiment of the present invention will be described with reference to FIGS. 3A, 3B1, 3B2, and 3C and FIG. 4.

The data input and output panel of one embodiment of the present invention includes sub-pixels arranged in matrix over an insulating surface and proximity sensors arranged instead of some of the sub-pixels.

Figure 3A:
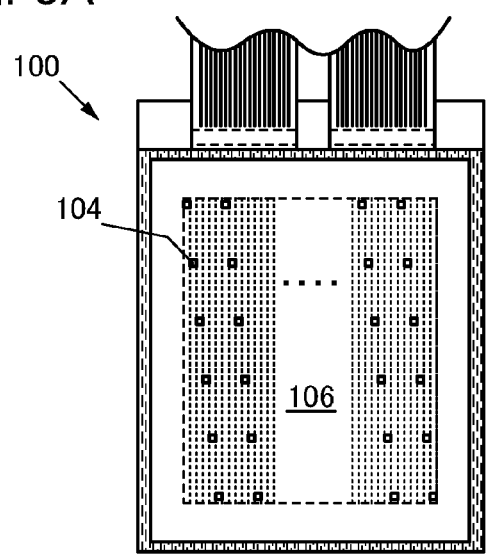
Figure 3A:
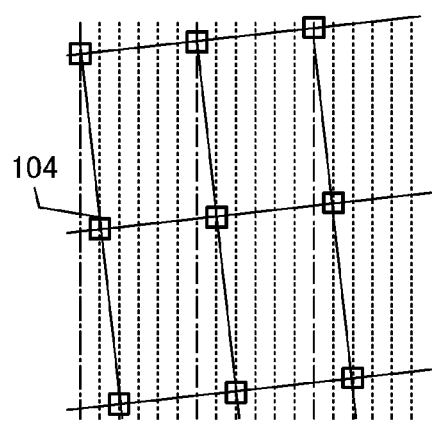
Figure 3A:
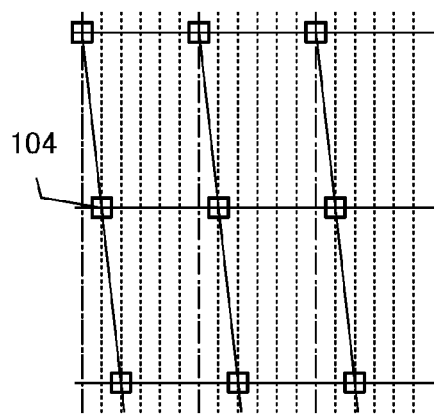

FIG. 3A is a top view illustrating a structure of the data input and output panel of one embodiment of the present invention. FIGS. 3B1, 3B2, and 3C are schematic diagrams each illustrating an arrangement of proximity sensors in a display portion 106 illustrated in FIG. 3A. Note that pixels are not illustrated in the drawings for simplicity.

Figure 4:
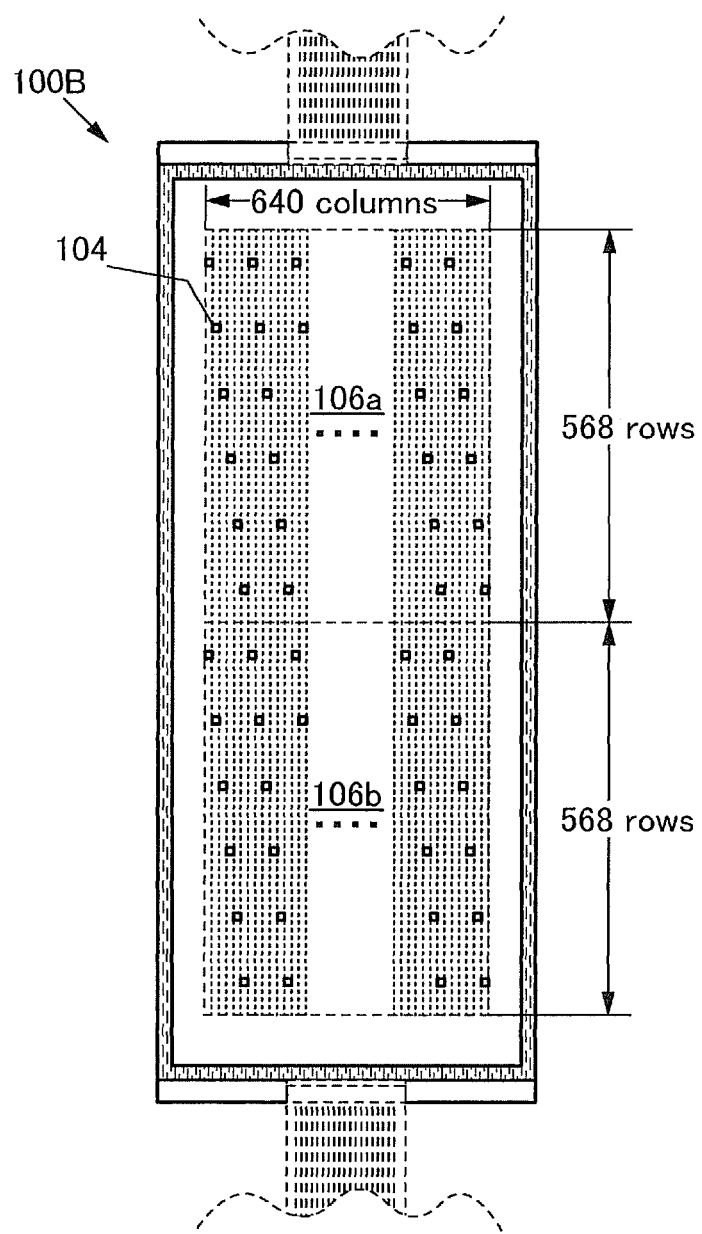
FIG. 4 is a block diagram illustrating a configuration of a data input and output panel of an embodiment.

FIG. 4 is a schematic top view of the data input and output panel of one embodiment of the present invention.

In a data input and output panel 100 described as an example in this embodiment, proximity sensors 104 are arranged scatteringly or discretely in the display portion 106 where the pixels are arranged in matrix.

The proximity sensors 104 are connected to signal lines but are not electrically connected to scan lines connected to the pixels. As a result, the proximity sensors 104 can be freely arranged in the display portion 106 without consideration of an arrangement of the scan lines.

For example, the proximity sensors 104 can be arranged in matrix equally in the display portion 106. Specifically, the proximity sensors 104 may be arranged at intersections of a square lattice (solid lines in FIG. 3B 1). Alternatively, the proximity sensors 104 may be arranged at intersections of a rhombic lattice (solid lines in FIG. 3B2). When the proximity sensors 104 are arranged almost equally in the display portion 106, distributions of the number of pixels per proximity sensors 104 in the display portion 106 can be substantially the same. Such a structure is preferable because an image with less unevenness and the like can be displayed.

Figure 3C:
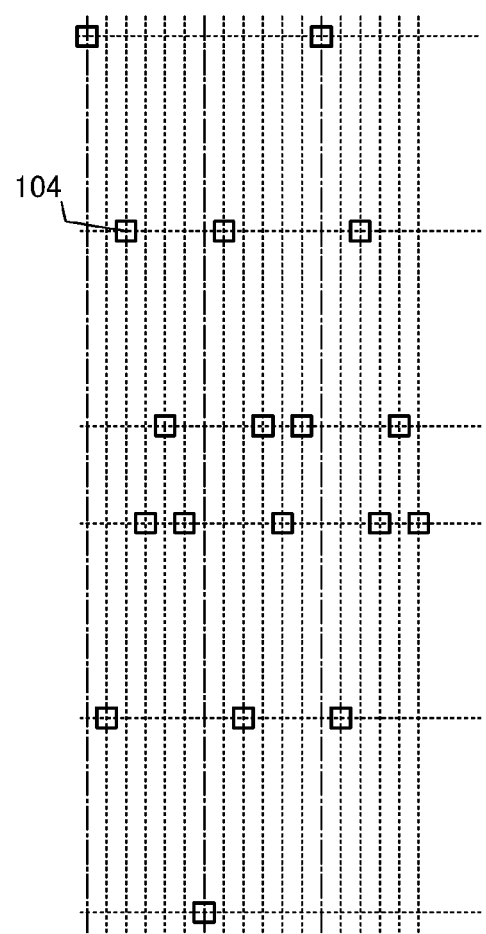

Alternatively, the proximity sensors 104 can be arranged unequally in the display portion 106 (see FIG. 3C). For example, the proximity sensors 104 are arranged with high density in a region whose coordinates need to be input exactly and with low density in a region whose coordinates are roughly input or not input. In such a case, time required for acquiring data from a region to which data is input less frequently can be allotted to a region to which data is input more frequently in the input and output panel.

In the above data input and output panel of one embodiment of the present invention, the proximity sensors are arranged scatteringly or discretely at predetermined positions in the display portion where the pixels are arranged in matrix. Further, electrical connections are made so that the signal lines from which image signals are transferred to the pixels can be supplied with sensing signals from the proximity sensors. Accordingly, data can be displayed on the display portion and in addition, a signal specifying the coordinates in the display portion can be input through the proximity sensors. As a result, it is possible to provide a novel data input and output panel to which data associated with displayed data can be input.

<<Arrangement Example of Proximity Sensors and Sub-Pixels>>

The case where proximity sensors driven with four signal lines are provided in a display portion will be described as an example with reference to FIG. 4.

A data input and output panel 100B includes a display portion. The display portion includes two stages 106a and 106b and pixels in a matrix of 1136 rows and 640 columns.

The stage 106a and the stage 106b each include 363520 (=568 rows×640 columns) pixels in matrix at a resolution of 326 ppi.

One pixel is composed of three sub-pixels and one sub-pixel is provided at an intersection of one scan line and one signal line. One sub-pixel is driven using signals supplied from one scan line and one signal line. This means that 568 scan lines and 1920 (=640×3) signal lines are provided in one stage.

In the case of using the proximity sensors driven with four signal lines, 480 (=1920÷4) proximity sensors can be arranged in one stage, which indicates that one in every about 757 (363520÷480) pixels can be replaced with one proximity sensor. For example, one proximity sensor can be provided in a region where sub-pixels are arranged in a matrix of 27 rows×27 columns, that is, in a region where pixels are arranged in a matrix of 27 rows×9 columns (in approximately 0.083 inches×0.028 inches).

Note that an area occupied by one proximity sensor is preferably smaller than or equal to that of one pixel. Further, the resolution of the pixel in the display portion is preferably 300 ppi or more and further preferably 326 ppi or more. In that case, a proximity sensor provided instead of a pixel can be hardly distinguished with naked eyes and a reduction in the quality of a displayed image can be suppressed.

According to the above estimation, in the data input and output panel 100B, one in every about 757 pixels is replaced with one proximity sensor 104. Although the amount of light emitted from the pixels is reduced when a pixel is replaced with a proximity sensor, the reduction is only approximately 0.13%. This indicates that the data input and output panel 100B is more favorable than a structure in which several percent of light emitted from a display portion is blocked by a capacitive touch sensor overlapping with the display portion.

This embodiment can be combined with any of the other embodiments in this specification as appropriate.

Embodiment 3

In this embodiment, a configuration of a data input and output panel of one embodiment of the present invention will be described with reference to FIGS. 5A and 5B.

Figure 5A:
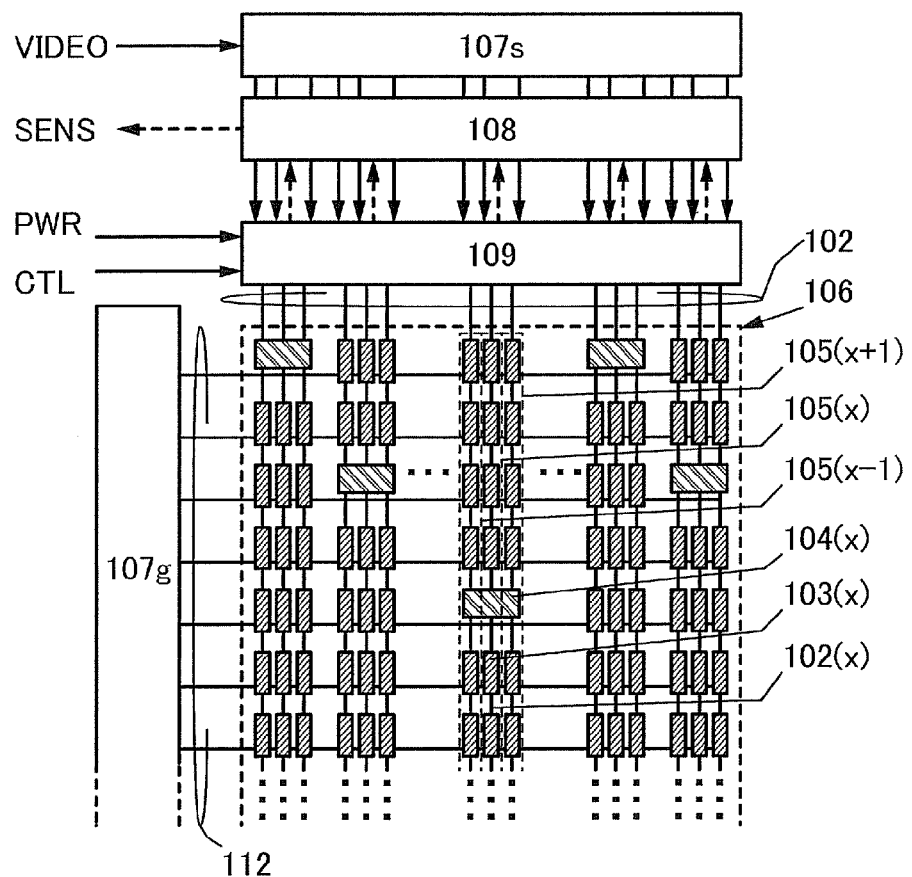
FIGS. 5A and 5B are block diagrams illustrating a configuration of a data input and output panel of an embodiment.

FIG. 5A is a block diagram illustrating a structure of the data input and output panel of one embodiment of the present invention. FIG. 5B is a schematic top view of the data input and output panel for illustrating an arrangement of circuits.

The data input and output panel described as an example in this embodiment includes, over a substrate over which a proximity sensor $104(x)$, signal lines 102, and pixels (e.g., a pixel $103(x)$) are provided, a selection circuit 109 for choosing whether to supply image signals or control signals to the signal lines 102 or to be supplied with sensing signals from the signal lines 102, a proximity sensor driver circuit 108 electrically connected to the signal lines 102, and a pixel driver circuit 107s electrically connected to the signal lines 102 (see FIG. 5A).

The above data input and output panel of one embodiment of the present invention includes, over one substrate, the proximity sensor, the pixels, and the signal lines which can transfer image signals to the pixels and to which sensing signals can be supplied from the proximity sensor. Further, the proximity sensor driver circuit 108 for driving the proximity sensor and the pixel driver circuit 107s are provided over the same substrate (see FIG. 5B). With such a structure, the proximity sensor driver circuit 108 and/or the pixel driver circuit 107s can be formed using the same process as the pixel. Accordingly, the novel data input and output panel 100C that requires a reduced number of manufacturing steps can be provided.

Note that a scanning line driver circuit 107g may be provided over the substrate 101. The selection circuit 109, the proximity sensor driver circuit 108, the pixel driver circuit 107s, and the scanning line driver circuit 107g can be formed over the same substrate in the same step.

Individual components included in a data input and output panel 100C of one embodiment of the present invention will be described below. Note that the components are not necessarily provided individually and one component may be integrated with another component.

<<Scanning Line Driver Circuit>>

The scanning line driver circuit 107g is electrically connected to a plurality of scan lines 112. The scan lines 112 extend to the display portion 106 and a plurality of pixels are electrically connected to one scan line.

Further, the scanning line driver circuit 107g can supply a signal for selecting one scan line. Accordingly, pixels electrically connected to the selected scan line can be selected.

<<Pixel Driver Circuit>>

The pixel driver circuit 107s is electrically connected to the selection circuit 109.

Further, the pixel driver circuit 107s can supply an image signal. Note that the pixel driver circuit 107s is supplied with an image signal VIDEO.

The scanning line driver circuit 107g and the pixel driver circuit 107s can be each configured with a logic circuit (e.g., a shift register) including a combination circuit.

Further, the scanning line driver circuit 107g and the pixel driver circuit 107s are supplied with a power supply potential and a control signal (e.g., a start pulse or a clock signal).

<<Proximity Sensor Driver Circuit>>

The proximity sensor driver circuit 108 is electrically connected to the selection circuit 109.

The proximity sensor driver circuit 108 can be supplied with a sensing signal and can supply a sensing signal SENS.

The proximity sensor driver circuit 108 can be, for example, a parallel-serial conversion circuit including a combination circuit.

<<Selection Circuit>>

The selection circuit 109 is electrically connected to the pixel driver circuit 107s, the proximity sensor driver circuit 108, and the signal lines 102.

The selection circuit 109 is preferably provided between the pixel driver circuit 107s and the display portion 106. Further, the selection circuit 109 is preferably provided between the proximity sensor driver circuit 108 and the display portion 106. When the selection circuit 109 is provided closer to the display portion 106, wirings can be prevented from intersecting and an increase in parasitic capacitance or wiring resistance can be prevented or suppressed, for example.

Note that the selection circuit 109 can be incorporated in another circuit.

The selection circuit 109 is supplied with power supply potentials PWR and control signals CTL (e.g., a start pulse and a clock signal).

The selection circuit 109 can choose whether to supply an image signal or a control signal to the signal line 102 or to be supplied with a sensing signal from the signal line 102.

Further, the selection circuit 109 has two modes.

In a first mode, a supplied image signal is supplied to the signal line 102.

Note that one signal line is electrically connected to a plurality of pixels (or a pixel column). Accordingly, an image signal can be supplied to pixels (e.g., the pixel $103(x)$) electrically connected to a scan line selected by the scanning line driver circuit 107g.

This means that the data input and output panel operates as an active matrix display panel in a period during which the selection circuit 109 is in the first mode.

In a second mode, a control signal is supplied to one signal line and a sensing signal is supplied from a different signal line. Note that the two signal lines are electrically connected to one proximity sensor (e.g., the proximity sensor $104(x)$). Accordingly, the proximity sensor can be supplied with a control signal and can supply a sensing signal.

A specific configuration example of the selection circuit 109 will be described in Embodiment 5 with reference to FIGS. 8A and 8B.

This embodiment can be combined with any of the other embodiments in this specification as appropriate.

Embodiment 4

In this embodiment, data input and output panels of one embodiment of the present invention will be described with reference to FIGS. 6A to 6C and FIGS. 7A to 7C.

Figure 6A:
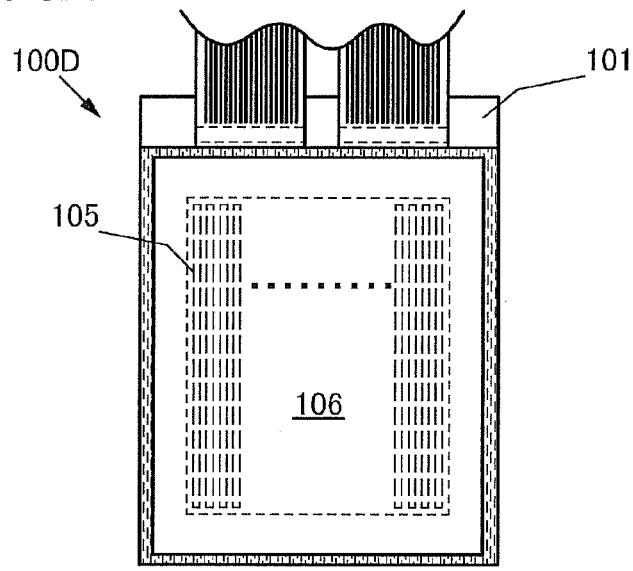
FIGS. 6A to 6C are block diagrams and a circuit diagram illustrating a configuration of a proximity sensor that can be used in a data input and output panel of an embodiment.
Figure 6B:
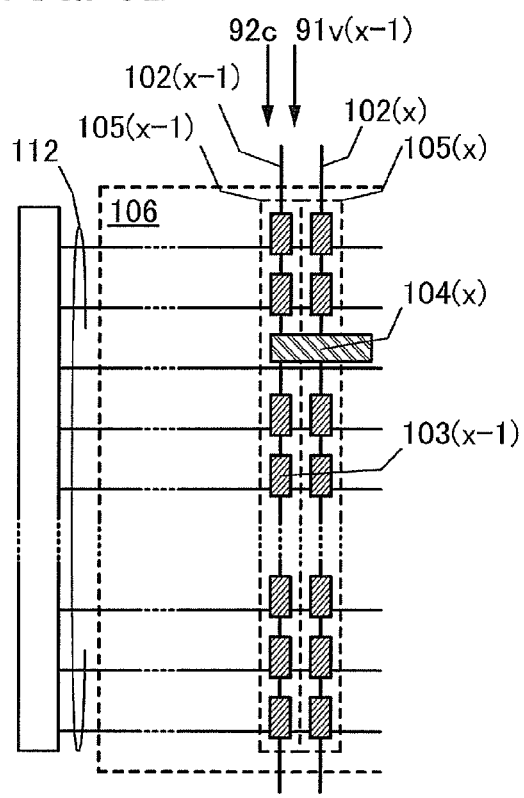
Figure 6C:
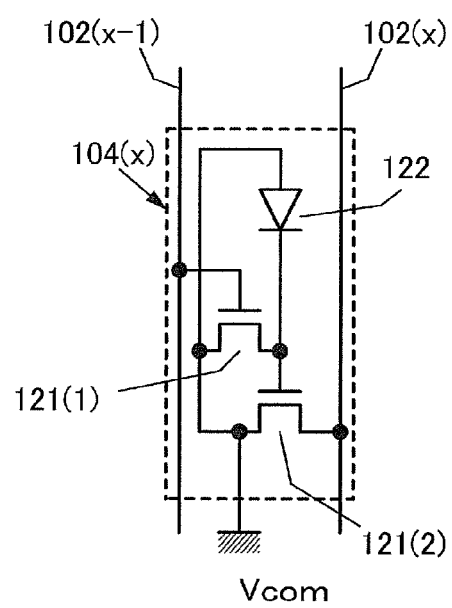

FIG. 6A is a top view of the data input and output panel of one embodiment of the present invention. FIG. 6B is a block diagram illustrating a configuration of a display portion in which a signal line, a pixel, and a proximity sensor are provided. FIG. 6C is a circuit diagram illustrating a proximity sensor that can be used in the data input and output panel.

A data input and output panel 100D described as an example in this embodiment includes a substrate 101 having an insulating surface and over the insulating surface, a proximity sensor $104(x)$, a first signal line $102(x)$ electrically connected to the proximity sensor $104(x)$, a second signal line $102(x-1)$ electrically connected to the proximity sensor $104(x)$, a first pixel column $105(x)$ electrically connected to the first signal line $102(x)$, a second pixel column $105(x-1)$ electrically connected to the second signal line $102(x-1)$, and a wiring capable of supplying a common potential Vcom are provided (see FIGS. 6A and 6B). Note that a scanning line driver circuit is electrically connected to a plurality of scan lines 112. The scan lines 112 extend to a display portion 106 and a plurality of pixels are electrically connected to one scan line.

The first signal line 102(x) can supply an image signal to the first pixel column 105(x) and can be supplied with a sensing signal from the proximity sensor 104(x).

The second signal line 102(x−1) can supply an image signal 91v(x−1) to the second pixel column 105(x−1) and can supply a control signal 92c (e.g., a reset signal) to the proximity sensor 104(x).

The proximity sensor 104(x) includes a first transistor 121(1), a second transistor 121(2), and a photoelectric conversion element 122. A gate and a first electrode of the first transistor 121(1) are electrically connected to the second signal line 102(x−1) and the wiring capable of supplying the common potential Vcom, respectively. A gate, a first electrode, and a second electrode of the second transistor 121(2) are electrically connected to a second electrode of the first transistor 121(1), the wiring capable of supplying the common potential Vcom, and the first signal line 102(x), respectively. A first electrode and a second electrode of the photoelectric conversion element are electrically connected to the wiring capable of supplying the common potential Vcom and the second electrode of the first transistor 121(1), respectively (see FIG. 6C).

Modification Example

A modification example of a data input and output panel of one embodiment of the present invention will be described with reference to FIGS. 7A to 7C.

Figure 7A:
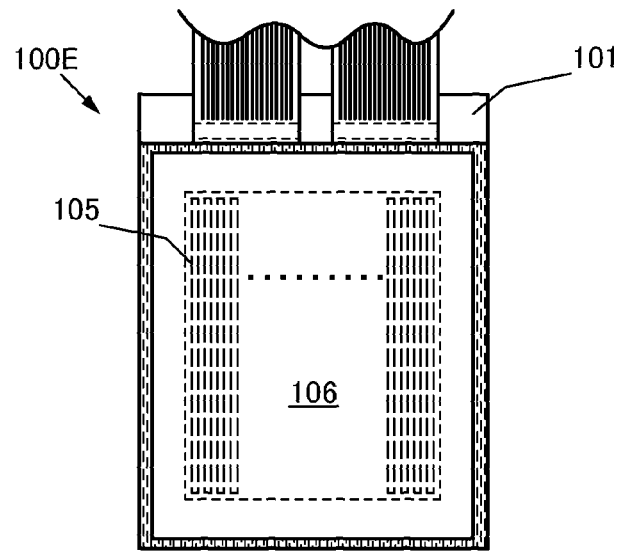
FIGS. 7A to 7C are block diagrams and a circuit diagram illustrating a configuration of a proximity sensor that can be used in a data input and output panel of an embodiment.

FIG. 7A is a top view of the data input and output panel of one embodiment of the present invention. FIG. 7B is a block diagram illustrating a configuration of a display portion in which a signal line, a pixel, and a proximity sensor are provided. FIG. 7C is a circuit diagram illustrating a proximity sensor that can be used in the data input and output panel.

Figure 7B:
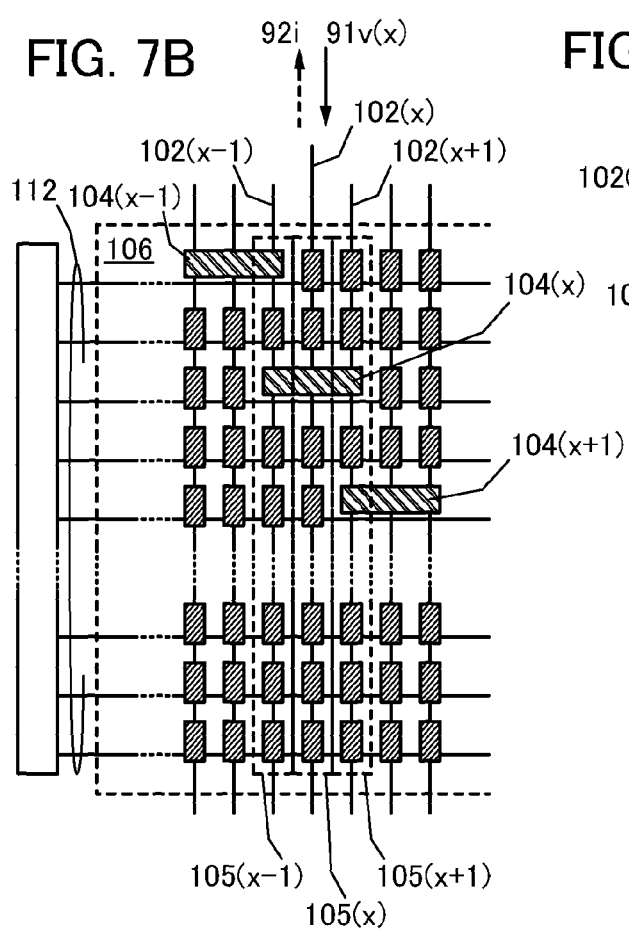
Figure 7C:
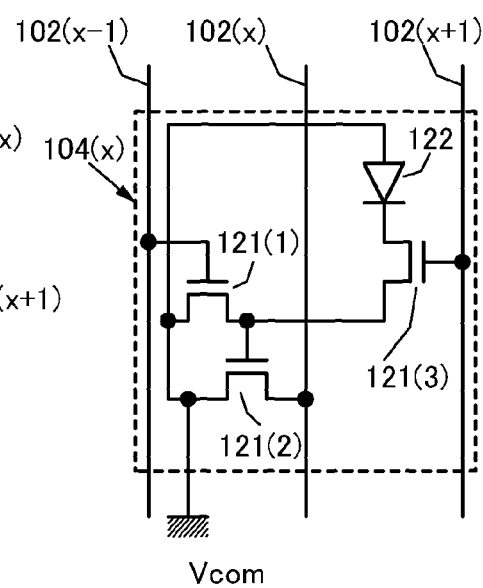

Note that a data input and output panel 100E illustrated in FIGS. 7A to 7C is the same as the data input and output panel illustrated in FIGS. 6A to 6C except that a proximity sensor which is driven by being supplied with two kinds of control signals are used and the connections of signal lines are different.

The data input and output panel described as an example in this embodiment includes a substrate 101 having an insulating surface and over the insulating surface, a proximity sensor 104(x), a first signal line 102(x) electrically connected to the proximity sensor 104(x), a second signal line 102(x−1) electrically connected to the proximity sensor 104(x), a third signal line 102(x+1) electrically connected to the proximity sensor 104(x), a first pixel column 105(x) electrically connected to the first signal line 102(x), a second pixel column 105(x−1) electrically connected to the second signal line 102(x−1), a third pixel column 105(x+1) electrically connected to the third signal line 102(x+1), and a wiring capable of supplying a common potential Vcom are provided.

The first signal line 102(x) can supply an image signal to the first pixel column 105(x) and can be supplied with a sensing signal from the proximity sensor 104(x).

The second signal line 102(x−1) can supply an image signal to the second pixel column 105(x−1) and can supply a first control signal (e.g., a reset signal) to the proximity sensor 104(x).

The third signal line 102(x+1) can supply an image signal to the third pixel column 105(x+1) and can supply a second control signal (e.g., a trigger signal) to the proximity sensor 104(x).

The proximity sensor 104(x) includes a first transistor 121(1), a second transistor 121(2), a third transistor 121(3), and a photoelectric conversion element 122. A gate and a first electrode of the first transistor 121(1) are electrically connected to the second signal line 102(x−1) and the wiring capable of supplying the common potential Vcom, respectively. A gate, a first electrode, and a second electrode of the second transistor 121(2) are electrically connected to a second electrode of the first transistor 121(1), the wiring capable of supplying the common potential Vcom, and the first signal line 102(x), respectively. A gate and a first electrode of the third transistor 121(3) are electrically connected to the third signal line 102(x+1) and the second electrode of the first transistor 121(1), respectively. A first electrode and a second electrode of the photoelectric conversion element are electrically connected to the wiring capable of supplying the common potential Vcom and a second electrode of the third transistor 121(3), respectively.

The above data input and output panel of one embodiment of the present invention includes the pixels, the signal lines, and the proximity sensors each including the photoelectric conversion element. The signal lines can supply image signals to the pixels, can supply control signals to the proximity sensors, and can be supplied with sensing signals from the proximity sensors. In such a manner, the number of signal lines can be reduced and as a result, a novel data input and output panel in which an area occupied by signal lines is reduced without increasing electric resistance of the signal lines can be provided. Alternatively, in such a manner, an extra signal line is unnecessary and as a result, a novel data input and output panel in which electric resistance of signal lines is reduced without increasing an area occupied by the signal lines can be provided.

Modification Example

Figure 10A:
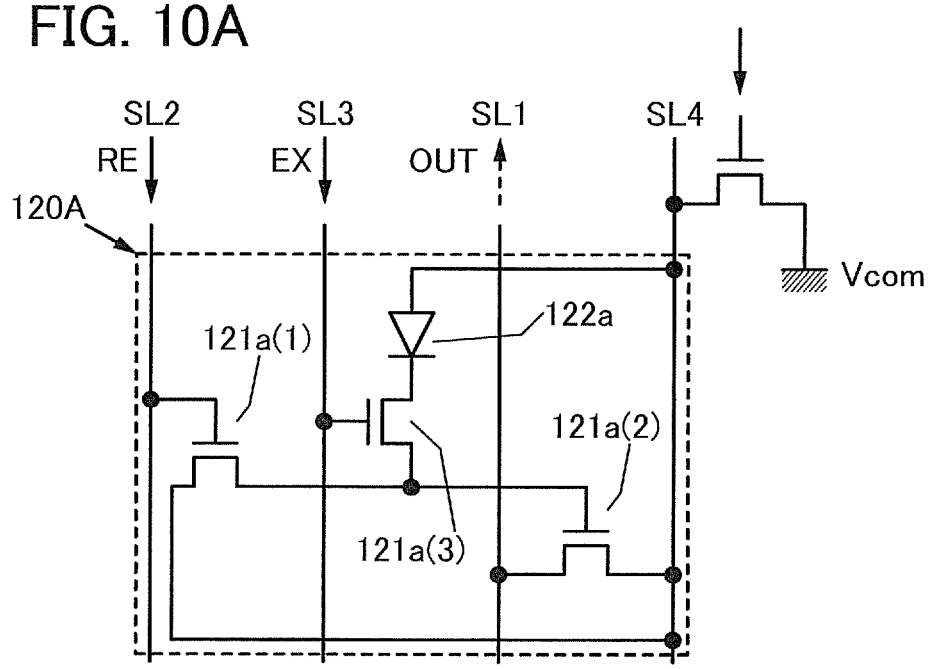
FIGS. 10A and 10B are circuit diagrams each illustrating a configuration of a proximity sensor that can be used in a data input and output panel of an embodiment.
Figure 10B:
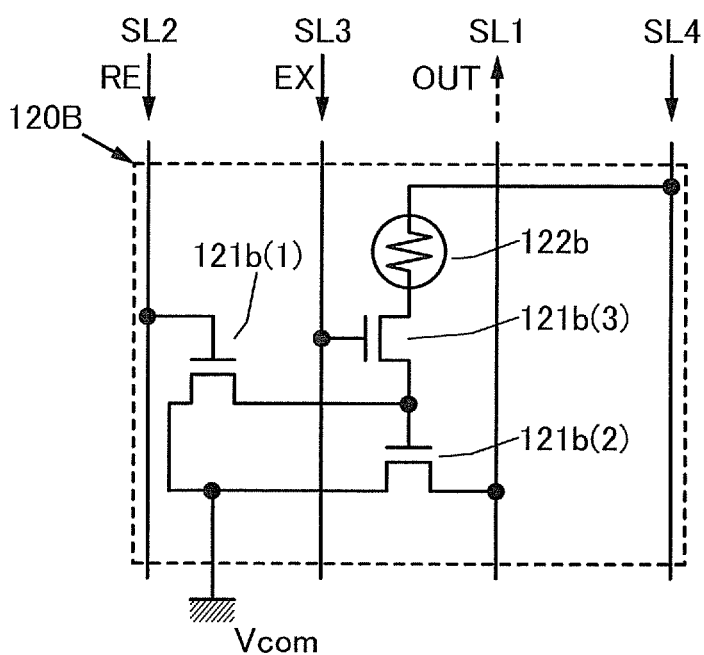

Modification examples of a proximity sensor that can be used in the data input and output panel of one embodiment of the present invention are described with reference to FIGS. 10A and 10B. FIGS. 10A and 10B are circuit diagrams each illustrating a proximity sensor that can be used in the data input and output panel of one embodiment of the present invention.

Proximity sensors each driven with four signal lines are illustrated in FIGS. 10A and 10B. Specifically, a proximity sensor 120A and a proximity sensor 120B are each electrically connected to a first signal line SL1, a second signal line SL2, a third signal line SL3, and a fourth signal line SL4.

The first signal line SL1 can supply a signal (sensing signal) generated when the proximity sensor senses the proximity of an object. The second signal line SL2 can supply a signal (reset signal) for making the proximity sensor to be in an initial state. The third signal line SL3 can supply a signal (trigger signal) for determining a period during which the proximity sensor senses the proximity of an object.

The proximity sensor 120A illustrated as an example in FIG. 10A is connected to the fourth signal line SL4 capable of supplying a common potential Vcom. The proximity sensor 120A includes a first transistor 121a(1), a second transistor 121a(2), and a third transistor 121a(3). A gate and a first electrode of the first transistor 121a(1) are electrically connected to the second signal line SL2 and the fourth signal line SL4, respectively. A gate, a first electrode, and a second electrode of the second transistor 121a(2) are electrically connected to a second electrode of the first transistor 121a(1), the fourth signal line SL4, and the first signal line SL1, respectively. A gate and a first electrode of the third transistor 121a(3) are electrically connected to the third signal line SL3 and the second electrode of the first transistor 121a(1), respectively. In addition, a photoelectric conversion element 122a whose first electrode and second electrode are electrically connected to the fourth signal line SL4 and the second electrode of the third transistor 121a(3), respectively, is included.

The proximity sensor 120B illustrated as an example in FIG. 10B is connected to the fourth signal line SL4 capable of supplying a high power supply potential VDD and a wiring capable of supplying a common potential Vcom. The proximity sensor 120B includes a first transistor 121b(1), a second transistor 121b(2), and a third transistor 121b(3). A gate and a first electrode of the first transistor 121b(1) are electrically connected to the second signal line SL2 and the wiring capable of supplying the common potential Vcom, respectively. A gate, a first electrode, and a second electrode of the second transistor 121b(2) are electrically connected to a second electrode of the first transistor 121b(1), the wiring capable of supplying the common potential Vcom, and the first signal line SL1, respectively. A gate and a first electrode of the third transistor 121b(3) are electrically connected to the third signal line SL3 and the second electrode of the first transistor 121b(1), respectively. In addition, a light dependent resistor 122b (also referred to as a photoresistor) whose first electrode and second electrode are electrically connected to the fourth signal line SL4 and the second electrode of the third transistor 121b(3), respectively, is included.

This embodiment can be combined with any of the other embodiments in this specification as appropriate.

Embodiment 5

In this embodiment, a selection circuit that can be used in a data input and output panel of one embodiment of the present invention will be described with reference to FIGS. 5A and 5B and FIGS. 8A and 8B.

FIG. 5A is a block diagram illustrating a structure of the data input and output panel of one embodiment of the present invention. FIG. 5B is a schematic top view for illustrating an arrangement of circuits included in the data input and output panel.

Figure 8A:
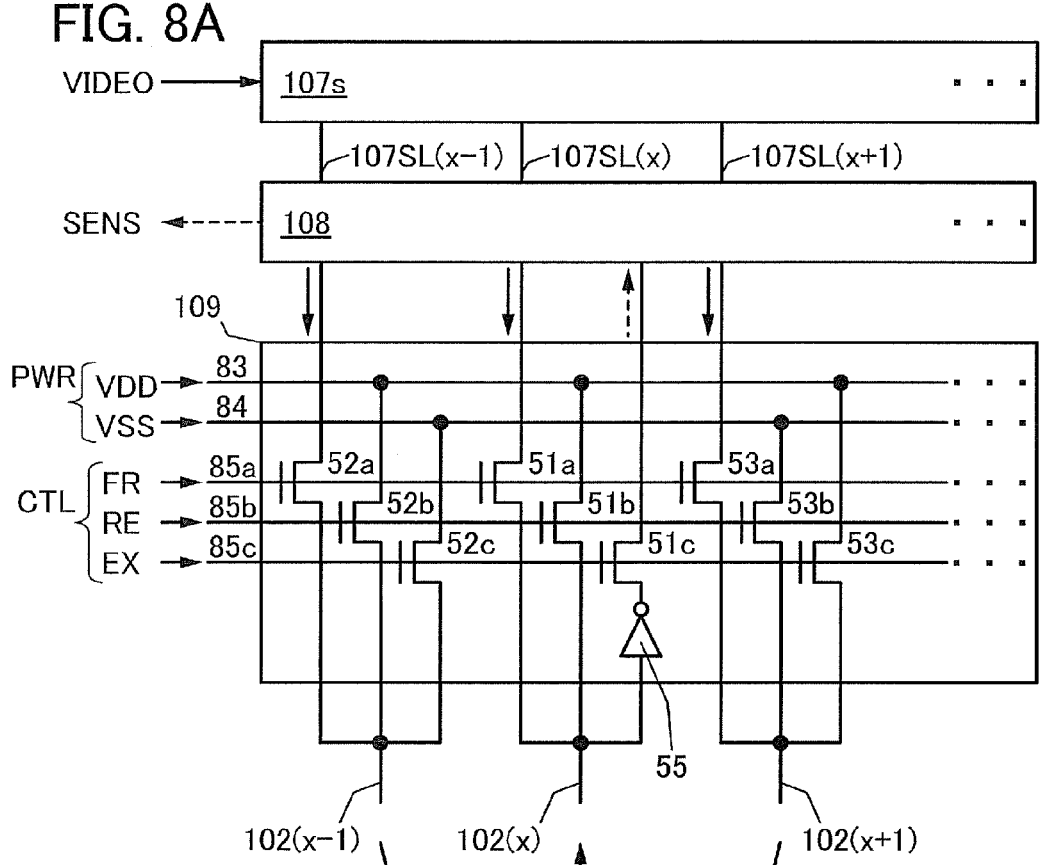
FIGS. 8A and 8B are a block diagram and a circuit diagram for illustrating a selection circuit that can be used in a data input and output panel of an embodiment.

FIG. 8A is a block diagram illustrating a configuration of the selection circuit 109 that can be used in the data input and output panel of one embodiment of the present invention. FIG. 8B is a circuit diagram illustrating a proximity sensor that can be used in the data input and output panel of one embodiment of the present invention.

The selection circuit 109 illustrated in FIG. 8A can be used in the data input and output panel 100E described in Embodiment 4 with reference to FIGS. 7A to 7C.

<Data Input and Output Panel>

In this embodiment, the selection circuit 109 that can be used in the data input and output panel 100C described in Embodiment 3 will be described as an example of a selection circuit (see FIGS. 5A and 5B).

Figure 5B:
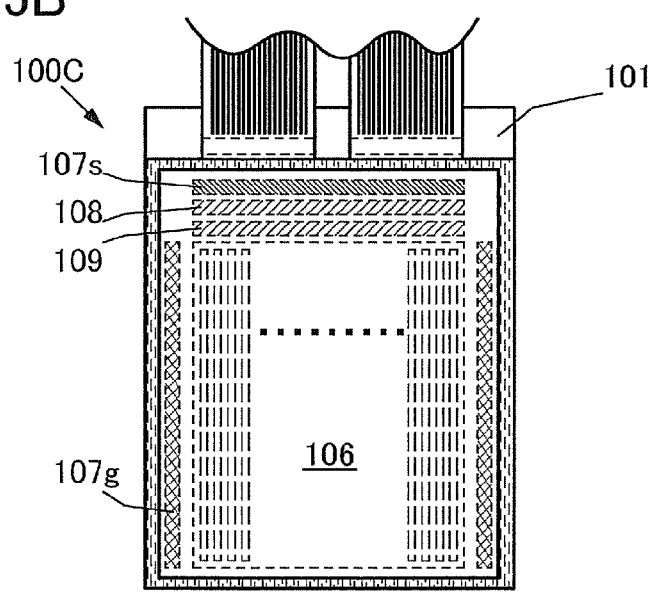

The data input and output panel 100C that can include the selection circuit 109 described as an example in this embodiment includes the substrate 101 having an insulating surface and the proximity sensor 104(x) over the substrate 101 (see FIGS. 5A and 5B). The data input and output panel 100C further includes a first signal line 102(x), a second signal line 102(x−1), and a third signal line 102(x+1) which are electrically connected to the proximity sensor 104(x) (see FIGS. 5A and 5B and FIGS. 8A and 8B).

Further, the data input and output panel 100C also includes a first pixel column 105(x) electrically connected to the first signal line 102(x), a second pixel column 105(x−1) electrically connected to the second signal line 102(x−1), and a third pixel column 105(x+1) electrically connected to the third signal line 102(x+1).

Figure 8B:
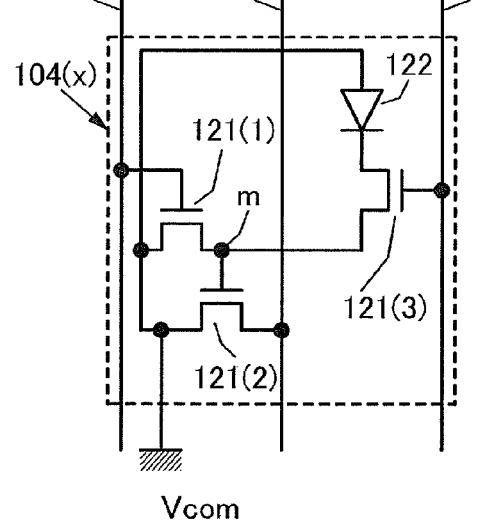

In addition, the data input and output panel 100C includes a wiring 83 capable of supplying a high power supply potential VDD, a wiring 84 capable of supplying a low power supply potential VSS, which is lower than the high power supply potential VDD, and a wiring capable of supplying a common potential Vcom (see FIGS. 8A and 8B).

The data input and output panel 100C further includes a control signal line 85a, a control signal line 85b, and a control signal line 85c which can supply signals CTL for controlling operation of the selection circuit 109. Note that the control signal line 85a, the control signal line 85b, and the control signal line 85c can supply a control signal FR, a control signal RE, and a control signal EX, respectively.

<Selection Circuit>

The selection circuit 109 is electrically connected to the pixel driver circuit 107s, the proximity sensor driver circuit 108, and the signal lines 102.

The selection circuit 109 selects and supplies a power supply potential or a control signal for driving the proximity sensor 104(x) connected to the three signal lines, and is supplied with a sensing signal from the proximity sensor 104(x).

Note that FIG. 8A illustrates only components electrically connected to three signal lines which are necessary to drive the proximity sensor 104(x) among the signal lines 102, and the other signal lines are not illustrated for simplicity and clarity of the configuration of the selection circuit 109. Further, FIG. 8B illustrates only the proximity sensor 104(x) and the other proximity sensors are not illustrated.

Specifically, the case where the proximity sensor 104(x) having the same configuration as the modification example described in Embodiment 4 with reference to FIG. 7C is driven with the first signal line 102(x), the second signal line 102(x−1), and the third signal line 102(x+1) is described.

The selection circuit 109 includes a plurality of switches. The selection circuit 109 described as an example includes three switches electrically connected to the three signal lines. A transistor is used as a switch in this embodiment; however, one embodiment of the present invention is not limited thereto.

The selection circuit 109 includes a switch 51a and a switch 51b. One terminal of the switch 51a and one terminal of the switch 51b are electrically connected to the first signal line 102(x). The selection circuit 109 also includes a switch 51c whose one terminal is electrically connected to an output terminal of an inverter circuit 55. Note that an input terminal of the inverter circuit 55 is electrically connected to the first signal line 102(x).

The other terminal of the switch 51a, the other terminal of the switch 51b, and the other terminal of the switch 51c are electrically connected to a signal line 107 SL(x) that can supply an image signal, the wiring 83 capable of supplying the high power supply potential VDD, and a wiring capable of supplying a sensing signal, respectively.

The selection circuit 109 further includes a switch 52a, a switch 52b, and a switch 52c. One terminal of the switch 52a, one terminal of the switch 52b, and one terminal of the switch 52c are electrically connected to the second signal line 102(x−1). Note that the other terminal of the switch 52a, the other terminal of the switch 52b, and the other terminal of the switch 52c are electrically connected to a signal line 107 SL(x−1) that can supply an image signal, the wiring 83 capable of supplying the high power supply potential VDD, and the wiring 84 capable of supplying the low power supply potential VSS, respectively.

The selection circuit 109 also includes a switch 53a, a switch 53b, and a switch 53c. One terminal of the switch 53a, one terminal of the switch 53b, and one terminal of the switch 53c are electrically connected to the third signal line 102(x+1). Note that the other terminal of the switch 53a, the other terminal of the switch 53b, and the other terminal of the switch 53c are electrically connected to a signal line 107 SL(x+1) that can supply an image signal, the wiring 84 capable of supplying the low power supply potential VSS, and the wiring capable of supplying the high power supply potential VDD, respectively.

The switch 51a, the switch 52a, and the switch 53a turn on or off in accordance with the control signal FR supplied from the control signal line 85a. The switch 51b, the switch 52b, and the switch 53b turn on or off in accordance with the control signal RE supplied from the control signal line 85b. The switch 51c, the switch 52c, and the switch 53c turn on or off in accordance with the control signal EX supplied from the control signal line 85c.

<Driving Method>

A method for driving the data input and output panel of one embodiment of the present invention will be described with reference to FIGS. 8A and 8B and FIG. 9.

Note that the proximity sensor 104(x) illustrated in FIG. 8B has the same configuration as the proximity sensor 104(x) described in Embodiment 4 with reference to FIG. 7C; thus, the descriptions in Embodiment 4 are referred to here. Note that a node where the second electrode of the first transistor 121(1) and the gate of the second transistor 121(2) are connected to each other is a node m.

<<First Step>>

Figure 9:
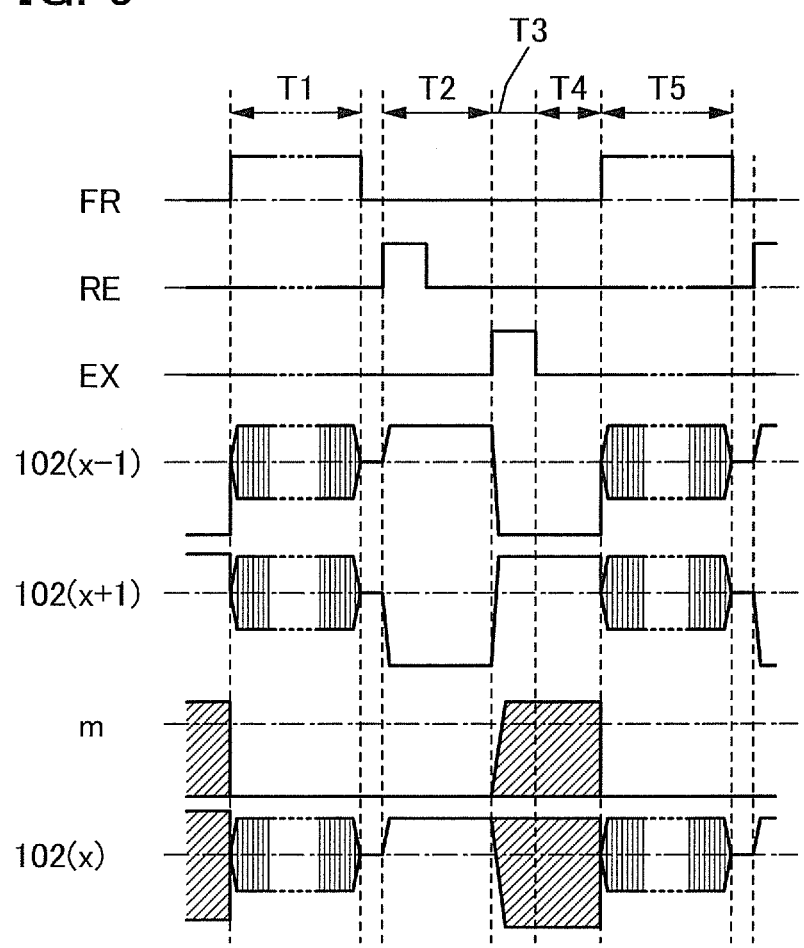
FIG. 9 is a timing chart illustrating operation of a data input and output panel of an embodiment.

In a first step, an image signal is supplied to pixels electrically connected to the first signal line 102(x), the second signal line 102(x−1), or the third signal line 102(x+1) (see FIG. 8A and a period T1 in FIG. 9). This period is also referred to as a frame period.

Specifically, the control signal line 85a supplies the control signal FR so that the switch 51a, the switch 52a, and the switch 53a are turned on.

The control signal line 85b supplies the control signal RE so that the switch 51b, the switch 52b, and the switch 53b are turned off. The control signal line 85c supplies the control signal EX so that the switch 51c, the switch 52c, and the switch 53c are turned off.

<<Second Step>>

In a second step, a first control signal (also referred to as a reset signal) is supplied to the proximity sensor 104(x) (see FIGS. 8A and 8B and a period T2 in FIG. 9).

Specifically, the control signal line 85b supplies the control signal RE so that the switch 51b, the switch 52b, and the switch 53b are turned on. Thus, the high power supply potential VDD is supplied to the first signal line 102(x) and the second signal line 102(x−1) and the low power supply potential VSS is supplied to the third signal line 102(x+1).

The control signal line 85a supplies the control signal FR so that the switch 51a, the switch 52a, and the switch 53a are turned off. The control signal line 85c supplies the control signal EX so that the switch 51c, the switch 52c, and the switch 53c are turned off.

As a result, the second signal line 102(x−1) supplies the high power supply potential VDD to the gate of the first transistor 121(1) to turn on the first transistor 121(1); accordingly, the potential of the node m becomes the common potential Vcom. Note that when the potential of the node m becomes the common potential Vcom, the proximity sensor 104(x) is initialized.

<<Third Step>>

In a third step, a second control signal (also referred to as a trigger signal) is supplied to the proximity sensor 104(x) (see FIGS. 8A and 8B and a period T3 in FIG. 9).

Specifically, the control signal line 85c supplies the control signal EX so that the switch 51c, the switch 52c, and the switch 53c are turned on. Thus, a sensing signal is supplied from the proximity sensor 104(x) to the first signal line 102(x). Further, the low power supply potential VSS is supplied to the second signal line 102(x−1) and the high power supply potential VDD is supplied to the third signal line 102(x+1).

The control signal line 85a supplies the control signal FR so that the switch 51a, the switch 52a, and the switch 53a are turned off. The control signal line 85b supplies the control signal RE so that the switch 51b, the switch 52b, and the switch 53b are turned off.

As a result, the second signal line 102(x−1) supplies the low power supply potential VSS to the gate of the first transistor 121(1) to turn off the first transistor 121(1). Further, the third signal line 102(x+1) supplies the high power supply potential VDD to the gate of the third transistor 121(3) to turn on the third transistor 121(3). Accordingly, the potential of the node m becomes higher than the common potential Vcom by a voltage generated by the electromotive force of the photoelectric conversion element 122.

The potential of the node m is supplied to the gate of the second transistor 121(2). The common potential Vcom is supplied to the first electrode of the second transistor 121(2). The voltage generated by the electromotive force of the photoelectric conversion element 122 is applied between the first electrode and the gate of the second transistor 121(2).

In the case where the voltage generated by the electromotive force of the photoelectric conversion element 122 exceeds the threshold value of the second transistor 121(2), the potential of the first signal line 102(x) to which the high power supply potential VDD is supplied in the second step is reduced to the common potential Vcom; thus, a sensing signal is supplied from the proximity sensor 104(x).

In the driving method of one embodiment of the present invention, a trigger signal can be input to a plurality of proximity sensors provided in an input and output panel at almost the same time. As a result, a number of proximity sensors can be driven in a short period of time (e.g., in a blanking period). This means that the input and output panel can be driven by a global shutter system.

In the input and output panel including a number of proximity sensors, when the proximity sensors receive proximity data by a global shutter system and supply sensing signals, and the sensing signals are acquired in succession, there is a time lapse after acquisition of a signal by a proximity sensor and before acquisition of a signal by another proximity sensor. When the potential of the node m changes because of this time lapse, a signal cannot be acquired accurately. Thus, a transistor whose first electrode or second electrode is connected to the node m preferably has a small off-leakage current.

Specifically, a transistor whose a channel formation region is formed using an oxide semiconductor and whose off-leakage current is extremely small is preferably used as the first transistor 121(1). In particular, a transistor formed using an oxide semiconductor containing indium is preferable.

Note that in this embodiment, the proximity sensor 104(x) supplies a sensing signal to the inverter circuit 55 through the first signal line 102(x) and supplies a signal with inverted polarity to the proximity sensor driver circuit 108 through the switch 51c.

Note that the potential of the node m is changed by the electromotive force of the photoelectric conversion element 122.

The proximity sensor 104(x) senses an object approaching the proximity sensor 104(x) by detecting a change in the amount of light incident on the proximity sensor 104(x).

In the case where a finger or the like approaches the proximity sensor so as to block light, for example, the electromotive force of the photoelectric conversion element 122 is small. Thus, a change in the potential of the node m which has become the common potential Vcom in the second step is smaller than that in the case where no object approaches to block light.

In the case where a finger or the like does not approaches the proximity sensor and light enters without being blocked, the electromotive force of the photoelectric conversion element 122 is large. Thus, a change in the potential of the node m which has become the common potential Vcom in the second step is larger than that in the case where an object approaches to block light.

<<Fourth Step>>

In a fourth step, the sensing signal supplied from the proximity sensor 104(x) is acquired (see FIGS. 8A and 8B and a period T4 in FIG. 9).

Specifically, the control signal line 85a supplies the control signal FR so that the switch 51a, the switch 52a, and the switch 53a are turned off. The control signal line 85b supplies the control signal RE so that the switch 51b, the switch 52b, and the switch 53b are turned off. The control signal line 85c supplies the control signal EX so that the switch 51c, the switch 52c, and the switch 53c are turned off.

In this embodiment, the proximity sensor 104(x) supplies the sensing signal to the proximity sensor driver circuit 108 in the third step.

The proximity sensor driver circuit 108 may invert the supplied sensing signal into a serial signal and output the serial signal in the fourth step.

<<Repeating the Steps>>

After that, the first to fourth steps are repeated. Specifically, in a period T5, in a manner similar to that in the period T1, an image signal is supplied to the pixels electrically connected to the first signal line 102(x), the second signal line 102(x−1), or the third signal line 102(x+1).

The periods T1 and T5 in FIG. 9 can be referred to as frame periods during which image data is written to the data input and output panel. Further, a period between the period T1 and the period T5 can be called a blanking period. Thus, one embodiment of the present invention can be referred to as a method for driving a data input and output panel including the step of supplying a reset signal and a trigger signal to a proximity sensor in a blanking period to acquire a sensing signal from the proximity sensor.

In the above method for driving the data input and output panel of one embodiment of the present invention, one frame image signal is supplied to the pixels in the display portion, a reset signal is supplied to the proximity sensor, a trigger signal is supplied to the proximity sensor, and a sensing signal is acquired from the proximity sensor. In this manner, data can be displayed on the display portion. Further, data can be input using a sensing signal acquired from a proximity sensor which is provided at known coordinates. Accordingly, a method for driving a semiconductor device having a novel data input and output panel with high definition display can be provided.

This embodiment can be combined with any of the other embodiments in this specification as appropriate.

Embodiment 6

In this embodiment, electronic devices of one embodiment of the present invention will be described with reference to FIGS. 11A to 11E.

An electronic device of one embodiment of the present invention includes any of the semiconductor devices each having a data input and output panel of one embodiment of the present invention and can display image data. For example, video data broadcasted or distributed or video data stored in a data storage medium can be displayed. Further, data processed by a data processing device can be displayed. Furthermore, an image used for operation of a control panel or the like can be displayed.

Examples of an electronic device displaying video data include a television device and a digital photo frame.

Examples of the data processing device include a computer, a digital camera, a digital video camera, and a portable information terminal.

Examples of an electronic device including a control panel include a mobile phone, a portable game machine, a large-scale game machine (e.g., a pachinko machine), and an audio reproducing device.

<Television Device>

Figure 11A:
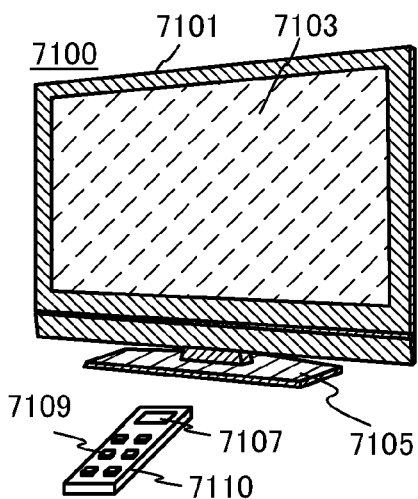
FIGS. 11A to 11E are diagrams each illustrating an electronic device of an embodiment.

A television device 7100 includes a display portion 7103 incorporated in a housing 7101 supported by a stand 7105 (see FIG. 11A).

An image displayed on the display portion 7103 of the television device 7100, a channel, volume, or the like is controlled using a separate remote controller 7110.

The remote controller 7110 includes a data input and output panel 7107, an operation key 7109, and the like.

An image displayed on the display portion 7103 is supplied from a receiver or a modem for receiving data broadcasted or distributed.

The television device 7100 may be connected to Internet to perform two-way (e.g., between a sender and a receiver or between receivers) communication of data.

<Data Processing Device>

Figure 11B:
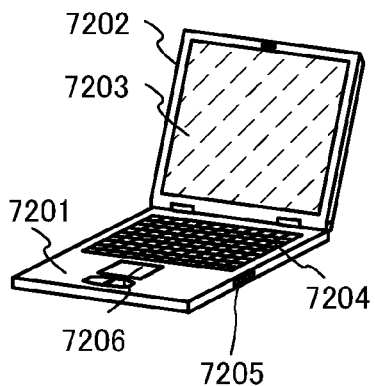

FIG. 11B illustrates a computer as an example of the data processing device. The computer includes a main body 7201, a housing 7202, a data input and output panel 7203, a keyboard 7204, an external connection port 7205, a pointing device 7206, and the like.

<Game Machine>

Figure 11C:
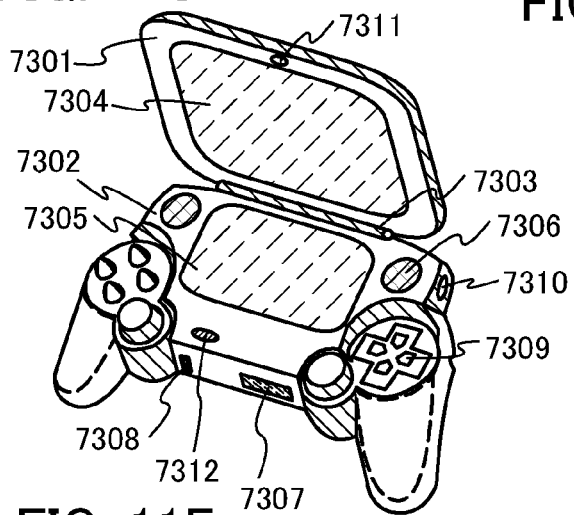

FIG. 11C illustrates an example of a portable game machine. A portable game machine illustrated as an example includes two housings, a housing 7301 and a housing 7302, which are jointed with a joint portion 7303 so that the portable game machine can be opened or folded. A data input and output panel 7304 is incorporated in the housing 7301 and a data input and output panel 7305 is incorporated in the housing 7302.

In addition, the portable game machine includes a speaker portion 7306, a recording medium insertion portion 7307, an LED lamp 7308, an input means (an operation key 7309, a connection terminal 7310, a sensor 7311 (a sensor having a function of measuring force, displacement, position, speed, acceleration, angular velocity, rotational frequency, distance, light, liquid, magnetism, temperature, chemical substance, sound, time, hardness, electric field, current, voltage, electric power, radiation, flow rate, humidity, gradient, oscillation, odor, or infrared rays), or a microphone 7312), and the like.

The portable game machine has a function of reading a program or data stored in a recording medium to display it on the data input and output panel, and a function of sharing information with another portable game machine by wireless communication.

<Mobile Phone>

Figure 11D:
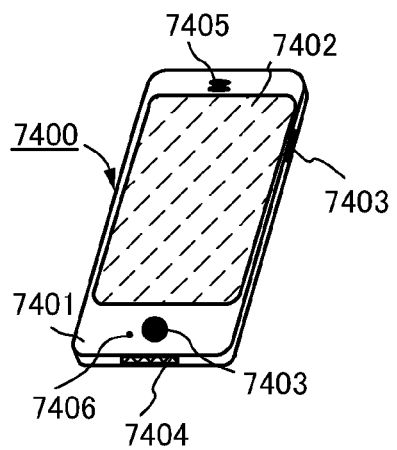

FIG. 11D illustrates an example of a mobile phone. A cellular phone 7400 is provided with a data input and output panel 7402 incorporated in a housing 7401, an operation button 7403, an external connection port 7404, a speaker 7405, a microphone 7406, and the like.

The data input and output panel 7402 includes a proximity sensor; thus, data can be input when a finger or the like touches or approaches the data input and output panel 7402.

When a sensing device including a sensor such as a gyroscope or an acceleration sensor for detecting inclination is provided, display on the screen of the data input and output panel 7402 can be automatically changed in direction by determining the orientation of the cellular phone 7400 (whether the cellular phone 7400 is placed horizontally or vertically for a landscape mode or a portrait mode).

The data input and output panel 7402 can function as a two-dimensional image sensor. In that case, images of a palm print and a fingerprint of a hand which touches the data input and output panel 7402, images of a palm vein and a finger vein which can be taken using a backlight or a sensing light source emitting near-infrared light, and the like can be used for personal authentication, for example.

<Portable Information Terminal>

Figure 11E:
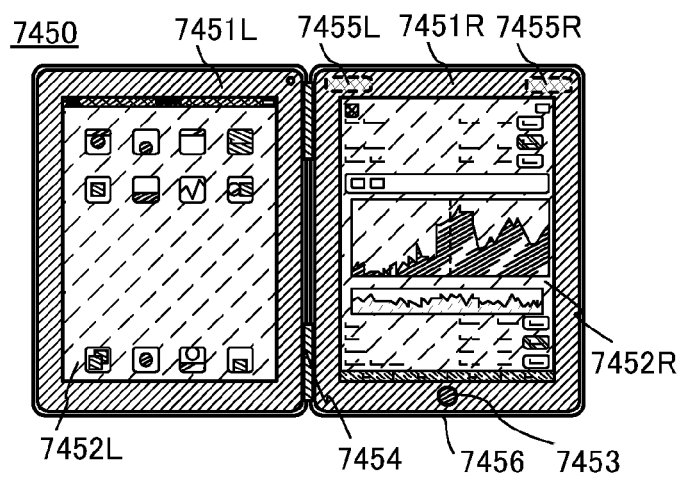

FIG. 11E illustrates an example of a foldable portable information terminal. A portable information terminal 7450 includes a housing 7451L and a housing 7451R connected by hinges 7454. The portable information terminal 7450 further includes an operation button 7453, a left speaker 7455L, and a right speaker 7455R. In addition, a side surface of the portable information terminal 7450 is provided with an external connection port 7456, which is not illustrated. Note that when the portable information terminal 7450 is folded on the hinges 7454 so that a data input and output panel 7452L provided in the housing 7451L and a data input and output panel 7452R provided in the housing 7451R can face each other, the data input and output panels can be protected by the housings.

Further, the portable information terminal 7450 can also include a gyroscope, an acceleration sensor, a global positioning system (GPS) receiver, or a video camera. For example, when a detection device including a sensor for detecting inclination, such as a gyroscope or an acceleration sensor, is provided, the orientation of the display screen can be automatically changed by determining the orientation of the portable information terminal 7450 (whether the portable information terminal 7450 is placed horizontally or vertically).

Furthermore, the portable information terminal 7450 can be connected to a network. The portable information terminal 7450 not only can display data on the Internet but also can be used as a terminal which controls another electronic device connected to the network from a distant place.

This embodiment can be combined with any of the other embodiments in this specification as appropriate.

This application is based on Japanese Patent Application serial no. 2013-040649 filed with Japan Patent Office on Mar. 1, 2013, the entire contents of which are hereby incorporated by reference.

What is claimed is:

1. A semiconductor device comprising:
   a display portion having first and second pixels over a substrate, the first and second pixels being directly connected to a first gate signal line;
   a proximity sensor adjacent to the first and second pixels and the first gate signal line in the display portion;
   a first signal line directly connected to the proximity sensor and the first pixel; and,
   a second signal line directly connected to the proximity sensor and the second pixel,
   wherein the first signal line is configured to supply a first image signal to the first pixel and to be supplied with a sensing signal from the proximity sensor, and
   wherein the second signal line is configured to supply a second image signal to the second pixel and to supply a control signal to the proximity sensor.

2. The semiconductor device according to claim 1, wherein the proximity sensor comprises:
   a first transistor having:
      a gate electrode electrically connected to the second signal line; and
      a first electrode electrically connected to a wiring configured to supply a common potential to the proximity sensor;
   a second transistor having:
      a gate electrode electrically connected to a second electrode of the first transistor;
      a first electrode electrically connected to the wiring; and
      a second electrode electrically connected to the first signal line; and
   a photoelectric conversion element having:
      a first electrode electrically connected to the wiring; and
      a second electrode electrically connected to the second electrode of the first transistor.

3. The semiconductor device according to claim 1, further comprising:
   a selection circuit electrically connected to the first and second signal lines;
   a proximity sensor driver circuit electrically connected to the selection circuit; and
   a pixel driver circuit electrically connected to the proximity sensor driver circuit.

4. The semiconductor device according to claim 3, wherein the selection circuit is configured to supply the first and second image signals to the first and second signal lines, respectively, to supply the control signal to the second signal line, and to be supplied with the sensing signal from the first signal line.

5. A semiconductor device comprising:
   a display portion having first and second pixels over a substrate, the first and second pixels being directly connected to a first gate signal line;
   a first proximity sensor in the display portion;
   a first signal line directly connected to the first proximity sensor and the first pixel; and
   a second signal line directly connected to the first proximity sensor and the second pixel,
   wherein the first signal line is configured to supply a first image signal to the first pixel and to be supplied with a sensing signal from the first proximity sensor, and
   wherein the second signal line is configured to supply a second image signal to the second pixel and to supply a control signal to the first proximity sensor.

6. The semiconductor device according to claim 5, wherein the first proximity sensor comprises:
- a first transistor having:
  - a gate electrode electrically connected to the second signal line; and
  - a first electrode electrically connected to a wiring configured to supply a common potential to the first proximity sensor;
- a second transistor having:
  - a gate electrode electrically connected to a second electrode of the first transistor;
  - a first electrode electrically connected to the wiring; and
  - a second electrode electrically connected to the first signal line; and
- a photoelectric conversion element having:
  - a first electrode electrically connected to the wiring; and
  - a second electrode electrically connected to the second electrode of the first transistor.

7. The semiconductor device according to claim 5, further comprising:
- a circuit configured to supply the first and second image signals to the first and second signal lines, respectively, to supply the control signal to the second signal line, and to be supplied with the sensing signal from the first signal line;
- a proximity sensor driver circuit electrically connected to the circuit; and
- a pixel driver circuit electrically connected to the proximity sensor driver circuit.

8. The semiconductor device according to claim 5, further comprising a second proximity sensor electrically connected to the second signal line.

9. A semiconductor device comprising:
- a display portion having first, second, and third pixels over a substrate, the first second, and third pixels being directly connected to a first gate signal line;
- a first proximity sensor in the display portion;
- a first signal line directly connected to the first proximity sensor and the first pixel;
- a second signal line directly connected to the first proximity sensor and the second pixel; and
- a third signal line directly connected to the first proximity sensor and the third pixel,
- wherein the first signal line is configured to supply a first image signal to the first pixel and to be supplied with a sensing signal from the first proximity sensor,
- wherein the second signal line is configured to supply a second image signal to the second pixel and to supply a first control signal to the first proximity sensor, and
- wherein the third signal line is configured to supply a third image signal to the third pixel and to supply a second control signal to the first proximity sensor.

10. The semiconductor device according to claim 9, wherein the first proximity sensor comprises:
- a first transistor having:
  - a gate electrode electrically connected to the second signal line; and
  - a first electrode electrically connected to a wiring configured to supply a common potential to the first proximity sensor;
- a second transistor having:
  - a gate electrode electrically connected to a second electrode of the first transistor;
  - a first electrode electrically connected to the wiring; and
  - a second electrode electrically connected to the first signal line;
- a third transistor having:
  - a gate electrode electrically connected to the third signal line; and
  - a first electrode electrically connected to the second electrode of the first transistor; and
- a photoelectric conversion element having:
  - a first electrode electrically connected to the wiring; and
  - a second electrode electrically connected to a second electrode of the third transistor.

11. The semiconductor device according to claim 9, further comprising:
- a circuit configured to supply the first, second, and third image signals to the first, second, and third signal lines, respectively, to supply the first and second control signals to the second and third signal lines, respectively, and to be supplied with the sensing signal from the first signal line;
- a proximity sensor driver circuit electrically connected to the circuit; and
- a pixel driver circuit electrically connected to the proximity sensor driver circuit.

12. The semiconductor device according to claim 9, further comprising:
- a second proximity sensor electrically connected to the second signal line; and
- a third proximity sensor electrically connected to the third signal line.

13. A method for driving a semiconductor device comprising a display portion having first and second pixels and a proximity sensor, the method comprising the steps of:
- supplying a first image signal to the first pixel from a pixel driver circuit via a selection circuit and a first signal line;
- supplying a second image signal to the second pixel from the pixel driver circuit via the selection circuit and a second signal line;
- supplying a control signal to the proximity sensor from the selection circuit via the second signal line; and
- acquiring a sensing signal supplied from the proximity sensor via the selection circuit and the first signal line.

* * * * *